(12) United States Patent
Umeda et al.

(10) Patent No.: US 7,800,329 B2
(45) Date of Patent: Sep. 21, 2010

(54) MOTOR CONTROL DEVICE, METHOD AND PROGRAM STORAGE MEDIUM

(75) Inventors: Nobuhiro Umeda, Fukuoka (JP); Eri Yamanaka, Fukuoka (JP); Dai Fukuda, Fukuoka (JP); Yuko Ikeda, Fukuoka (JP)

(73) Assignee: Kabushiki Kaisha Yaskawa Denki, Kitakyushu-shi (JP)

( * ) Notice: Subject to any disclaimer, the term of this patent is extended or adjusted under 35 U.S.C. 154(b) by 349 days.

(21) Appl. No.: 12/104,741

(22) Filed: Apr. 17, 2008

(65) Prior Publication Data

US 2008/0224648 A1  Sep. 18, 2008

Related U.S. Application Data

(63) Continuation-in-part of application No. PCT/JP2006/320101, filed on Oct. 6, 2006.

(30) Foreign Application Priority Data

Oct. 18, 2005  (JP) .............................. 2005-303170

(51) Int. Cl.
  *G05B 11/32* (2006.01)
  *G05B 19/416* (2006.01)
  *G06F 17/00* (2006.01)
(52) U.S. Cl. ....................... 318/434; 318/561; 318/260; 700/69
(58) Field of Classification Search ................. 318/560, 318/561, 567, 568.18, 632, 260, 434; 700/69
See application file for complete search history.

(56) References Cited

U.S. PATENT DOCUMENTS

| | | | | |
|---|---|---|---|---|
| 5,495,158 A | * | 2/1996 | Schmidt et al. ............. | 318/561 |
| 5,736,824 A | * | 4/1998 | Sato et al. ................... | 318/561 |
| 6,144,181 A | * | 11/2000 | Rehm et al. ................. | 318/629 |
| 6,477,433 B1 | * | 11/2002 | Bailey ......................... | 700/69 |
| 6,515,442 B1 | * | 2/2003 | Okubo et al. ............... | 318/560 |
| 6,809,491 B2 | * | 10/2004 | Nakashima et al. ..... | 318/568.18 |
| 6,936,990 B2 | * | 8/2005 | Oyama et al. .............. | 318/632 |

(Continued)

*Primary Examiner*—Walter Benson
*Assistant Examiner*—Eduardo Colon
(74) *Attorney, Agent, or Firm*—Westerman, Hattori, Daniels & Adrian, LLP

(57) ABSTRACT

There are provided a motor control device and a method for deciding a velocity instruction shape within the limit of a movement range, a velocity, and an acceleration of an object device while maintaining the acceleration as high as possible in inertia identification. The motor control device includes a position control unit for generating a velocity instruction based on a position instruction and a motor position, a velocity control unit for generating a torque instruction based on the velocity instruction and a motor velocity, and a motor drive unit for generating motor current from the torque instruction. The motor control device further includes a model control unit for generating a model torque instruction based on the velocity instruction and a model velocity, an inertia identification unit for identifying an inertia from a predetermined positional instruction according to a ratio of the motor torque instruction integrated value obtained by temporal integration of the torque instruction of the motor at a predetermined section and the model torque instruction integrated value obtained by temporal integration of the model torque instruction at a predetermined section, and an instruction shape generation unit for automatically generating an instruction shape upon identification according to the conditions of the maximum movable distance, the permitted velocity, the permitted acceleration, and the maximum operation time of the object machine.

8 Claims, 6 Drawing Sheets

U.S. PATENT DOCUMENTS 6,961,628 B2 * 11/2005 Yutkowitz .................... 700/37
7,068,002 B2 * 6/2006 Tsutsui ....................... 318/560
2009/0112376 A1 * 4/2009 Eguchi ....................... 700/302

* cited by examiner

MOTOR CONTROL DEVICE, METHOD AND PROGRAM STORAGE MEDIUM

RELATED APPLICATIONS

This application is a continuation-in-part of International Patent Application No. PCT/JP2006/320101, filed on Oct. 6, 2006. This application claims priority under 35 U.S.C. §119 to Japanese Patent Applications No. 2005-303170 filed on Oct. 18, 2005. Each of the entire disclosures of these applications is incorporated herein by reference in its entirety.

BACKGROUND OF THE INVENTION

1. Field of the Invention

The present invention relates to a motor control device and a method for identifying, especially inertia in a control device such as, e.g., a robot and a working machine.

2. Description of Related Art

FIG. 3 shows a control structure of a conventional motor control device. The reference numeral 21 denotes a motor control unit, 22 denotes a model control unit, 23 denotes a velocity control proportional gain, 24 denotes a differentiator, 25 denotes an integrator, 26 is a velocity control proportional gain of the model control unit, 27 denotes an integrator showing the inertia of the model control unit, and 28 denotes an integrator. Vref denotes a velocity instruction, Vfb denotes a motor velocity, Tref denotes a torque instruction, STref denotes a torque instruction time integrated value, Vfb' denotes a model velocity, and STref' denotes a model torque instruction time integrated value. In a conventional motor control device, the motor control device is equipped with a motor control unit for controlling a motor velocity and a model control unit for simulating a velocity control by a model, and configured to identify the inertia based on the ratio of the value STref obtained by temporal integration of the torque instruction of the velocity control unit and the value STref' obtained by temporal integration of the torque instruction of the model control unit when the motor is operated in accordance with a predetermined velocity pattern (see Patent Document 1).

Furthermore, the conventional motor control device is also equipped with a velocity instruction signal generation unit for generating a velocity pattern in which a control object is accelerated/decelerated in accordance with a predetermined pattern, a position control unit for controlling the position of the control object and a velocity control unit for controlling the velocity of the control object by accelerating/decelerating the control object based on the velocity pattern generated from the velocity instruction signal generation unit, and an observation device including an encoder for observing the current position of the control object.

In FIG. 4, Step 4-1 is a step of accelerating the load inertia up to an instruction velocity Vmax. Step 4-2 is a step of discriminating whether the instruction velocity V has reached a set instruction velocity Vn. The set instruction velocity Vn should be 50% or more of the maximum instruction velocity Vmax. The preferable set instruction velocity is about 70% thereof. Step 4-3 is a step of calculating the deviation at the time of Vn when the instruction velocity V has reached the set instruction velocity Vn. Step 4-4 is a step for discriminating whether the instruction velocity V has reached the maximum instruction velocity Vmax. Step 4-5 is a step for decelerating the actual velocity down to a stop (instruction velocity=0) when the instruction velocity V has reached the maximum instruction velocity Vmax. Step 4-6 is a step for discriminating whether the actual velocity has reached zero. Step 4-7 is a step for identifying the load inertia based on the deviation.

In accordance with the method shown in FIG. 4, the load inertia of the control object is identified based on the positional deviation between the instruction position of the control object and the current position observed by the observation device at the time when the instruction velocity generated from the velocity instruction signal generator has reached a previously set predetermined velocity (see Patent Document 2).

Patent Document 1: International Official Gazette No. WO96/37039 (page 6, FIG. 1)

Patent Document 2: Japanese Patent No. 3509413 (page 12, FIG. 5)

In a conventional control constant adjusting device for identifying inertia, the identification accuracy varies depending on a velocity instruction pattern shape. Accordingly, the velocity instruction pattern should be determined by trial and error. Since the predetermined velocity pattern determined as mentioned above is used, there is a problem that the identification operation cannot be executed depending on the limitations of the movable range, the velocity and the acceleration of the installed machine. Furthermore, in the examples disclosed in Patent Document 2, there is a problem that the prediction of the movement distance cannot be performed.

SUMMARY OF THE INVENTION

The present invention was made in view of such problems, and aims to provide a motor control device and method for deciding a velocity instruction shape within limitations of a movable range, a velocity and an acceleration of an object device while keeping an acceleration velocity, which is important in terms of the inertia identification, as high as possible.

In order to solve the aforementioned problem, the present invention provides the following means.

A motor control device, comprises:

a position control unit for generating a velocity instruction based on a position instruction and a motor position;

a velocity control unit for generating a torque instruction based on the velocity instruction and a motor velocity; and a motor drive unit for generating motor current based on the torque instruction, wherein the motor control device further comprises a model control unit for generating a model torque instruction based on the velocity instruction and a model velocity, an inertia identification unit for identifying inertia from a predetermined position instruction according to a ratio of a motor torque instruction integrated value obtained by temporal integration of the torque instruction of the motor at a predetermined section and a model torque instruction integrated value obtained by temporal integration of the model torque instruction at a predetermined section, and an instruction shape generation unit for automatically generating an instruction shape upon identification according to conditions of a maximum movable distance, a permitted velocity, a permitted acceleration, and a maximum operation time of an object machine.

In the motor control device as recited in claim 1, the motor control device further comprises a velocity feedforward instruction generation portion for generating a velocity feedforward instruction by differentiating the position instruction, and the model control unit is configured to generate the model torque instruction based on the velocity feedforward instruction and the model velocity.

Furthermore, in the motor control device as recited in claim 1, the instruction shape generation unit generates the instruction shape by setting respective smaller values of the maximum movable distance, the permitted velocity and the permitted acceleration of the object machine and the maximum movable distance, the permitted velocity and the permitted acceleration of the motor as the conditions of the maximum movable distance, the permitted velocity, and the permitted acceleration.

Furthermore, in the motor control device as recited in claim 3, the instruction shape generation unit generates a trapezoidal velocity instruction and calculates uniquely the instruction shape by fixing the ratio of an acceleration section, a constant velocity section and a deceleration section.

Furthermore, in the motor control device as recited in claim 4, a ratio of the acceleration section, the constant velocity section and the deceleration section is set to 1:2:1, the maximum movable distance Amax, the permitted velocity value Vmax, the permitted acceleration value Amax, the permitted operation time Tmax are set, and the velocity instruction V is calculated by the following equation (1):

$$V = A\max \times T\max / 4 \qquad (1)$$

the calculated velocity instruction V and the permitted velocity Vmax are compared, and the smaller value thereof is set as the velocity instruction V, and the movement distance P is calculated by the following equation (2):

$$P = 3V^2 / A\max \qquad (2)$$

the calculated movement distance P is compared with the maximum movable distance Pmax, and the smaller value thereof is set as a new movement distance P.

A motor control method of a motor control device comprising a position control unit for generating a velocity instruction based on a position instruction and a motor position, a velocity control unit for generating a torque instruction based on the velocity instruction and a motor velocity, a motor drive unit for generating motor current based on the torque instruction, a model control unit for generating a model torque instruction based on the velocity instruction and a model velocity, and an inertia identification unit for identifying inertia from a predetermined position instruction according to a ratio of the motor torque instruction integrated value obtained by temporal integration of the torque instruction of the motor at a predetermined section and a model torque instruction integrated value obtained by temporal integration of the model torque instruction at a predetermined section, the method comprising:

a step (step 1) of setting a maximum movable distance Pmax, a permitted velocity value Vmax, and a permitted acceleration value Amax;

a step (step 2) of calculating a velocity instruction V based on the set permitted acceleration value Amax and a maximum operation time Tmax;

a step (step 3) of comparing the velocity instruction V and the permitted velocity value Vmax and setting the smaller value thereof as the velocity instruction V;

a step (step 4) of calculating the movement distance P based on the velocity instruction V and the permitted acceleration value Amax; and a step (step 5) of comparing the calculated movement distance P and the maximum movable distance Pmax and setting the smaller value thereof as the movement distance P.

Furthermore, in the motor control method as recited in claim 6, the velocity instruction is set as a trapezoidal shape in which a ratio of the acceleration section, the constant velocity section and the deceleration section is set as 1:2:1, the velocity instruction V is calculated by the following equation (1):

$$V = A\max \times T\max / 4 \qquad (1)$$

the calculated velocity instruction V and the permitted velocity Vmax are compared, and the smaller value thereof is set as the velocity instruction V, and the movement distance P is calculated by the following equation (2):

$$P = 3V^2 / A\max \qquad (2)$$

the calculated movement distance P is compared with the maximum movable distance Pmax, and the smaller value thereof is set as the movement distance P.

Furthermore, a program storage medium stores a program for automatically generating an inertia identifying velocity instruction shape in a motor control device, the program is configured to execute:

a step (step 1) of setting a maximum movable distance Pmax, a permitted velocity value Vmax, and a permitted acceleration value Amax;

a step (step 2) of calculating a velocity instruction V based on the set permitted acceleration value Amax and a maximum operation time Tmax;

a step (step 3) of comparing the velocity instruction V and the permitted velocity value Vmax and setting the smaller value thereof as the velocity instruction V;

a step (step 4) of calculating a movement distance P based on the velocity instruction V and the permitted acceleration value Amax; and a step (step 5) of comparing the calculated movement distance P and the maximum movable distance Pmax and setting the smaller value thereof as the movement distance P.

According to the present invention, the motor control device of the present invention can automatically generate the most appropriate velocity instruction shape pattern for identifying the inertia while keeping the acceleration as high as possible by simply inputting the maximum movable distance, the permitted velocity, the permitted acceleration, and the permitted operation time of the machine without requiring any skill to identify the inertia (inertia moment) of a servo motor for use in, e.g., a robot and a numerical control device.

Furthermore, the conditions can be set depending on the performance of the motor itself as well as that of the machine, which enables execution of the inertia identification within the range of the conditions.

DETAILED DESCRIPTION OF THE INVENTION

Hereafter, concrete examples of a method according to the present invention will be explained with reference to the drawings.

EXAMPLE 1

Figure 1:
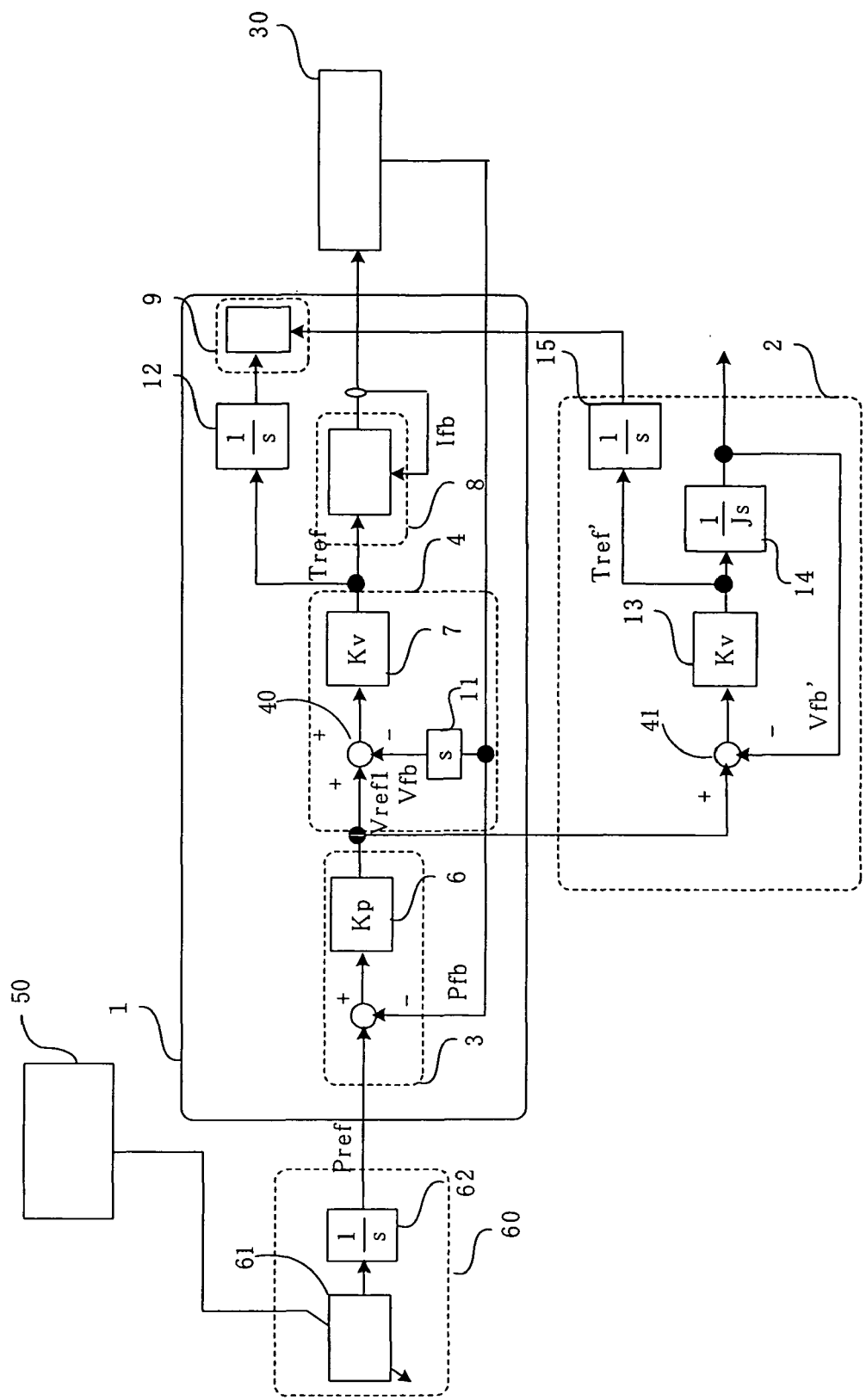
FIG. 1 is a block diagram showing a first structure of a motor control device for executing the method of the present invention.

FIG. 1 is a block diagram showing a first structure of a motor control device for executing a method of the present invention. The reference numeral 1 denotes a motor control unit, and 2 denotes a model control unit. 3 denotes a position control portion, 4 denotes a velocity control portion, 6 denotes a position proportional gain, 7 denotes a velocity control proportional gain, 8 denotes a current control portion, 9 denotes an inertia identification portion, 11 denotes a differentiator, 12 denotes an integrator, 13 denotes a velocity control proportional gain of the model control unit, 14 denotes an integrator showing the inertial of the model control unit and 15 denotes an integrator of the model control unit. The control object 30 to be driven by the motor control unit 1 includes a motor and a load. Pref denotes a position instruction, Pfb denotes a motor position, Vref1 denotes a velocity instruction, Vfb denotes a motor velocity, Tref denotes a torque instruction, STref denotes a torque instruction time integrated value, Vfb' denotes a model velocity, and STref' denotes a model torque instruction time integrated value.

The model control unit 2 is comprised of a velocity control proportional gain 13, an integrator 14 showing the inertia, an integrator 15 and an adder 41.

The motor control unit 2 is a model of a motor itself and configured to reproduce the response with respect to the velocity instruction Vref1. The inertia identification portion 9 compares the output of the integrator 12 and the output of the model integrator 15 to identify the inertia.

Figure 5:
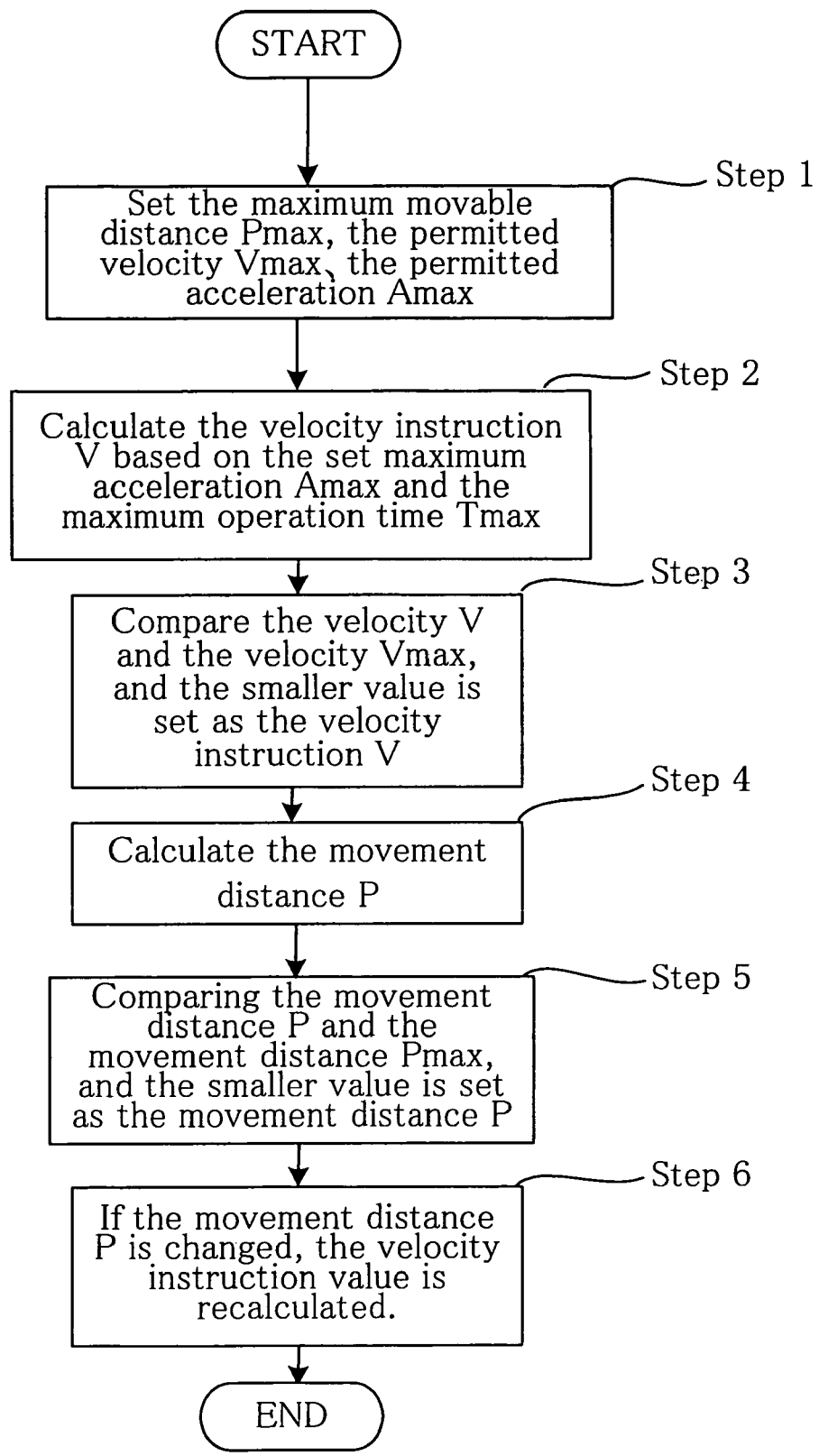
FIG. 5 is a flowchart showing processing steps for generating the most appropriate instruction according to the present invention.

50 denotes an instruction shape generation portion. This instruction shape generation portion 50 is a portion for generating a velocity instruction shape to be inputted into the control unit. An example of the processing flowchart is shown in FIG. 5. 60 denotes an instruction generation unit, 61 denotes a velocity instruction generation portion, and 62 denotes an integrator in the instruction generation unit. In accordance with the velocity instruction shape generated by the instruction shape generation portion 50, the velocity instruction generation portion 61 outputs a velocity instruction and the velocity instruction is integrated by the integrator 62 to generate a position instruction which is an input of the motor control unit 1.

The instruction shape generation portion 50 decides the velocity instruction shape most appropriate to inertial identification within the range of the set limitations. Therefore, the instruction to be outputted from the instruction generation unit 60 based on the appropriate velocity instruction shape is the most suitable for the inertia identification.

FIG. 5 is a flowchart showing processing steps for generating the most suitable instruction in a motor control device of the present invention. The method of the present invention will be explained step by step with reference to the drawings.

Figure 6:
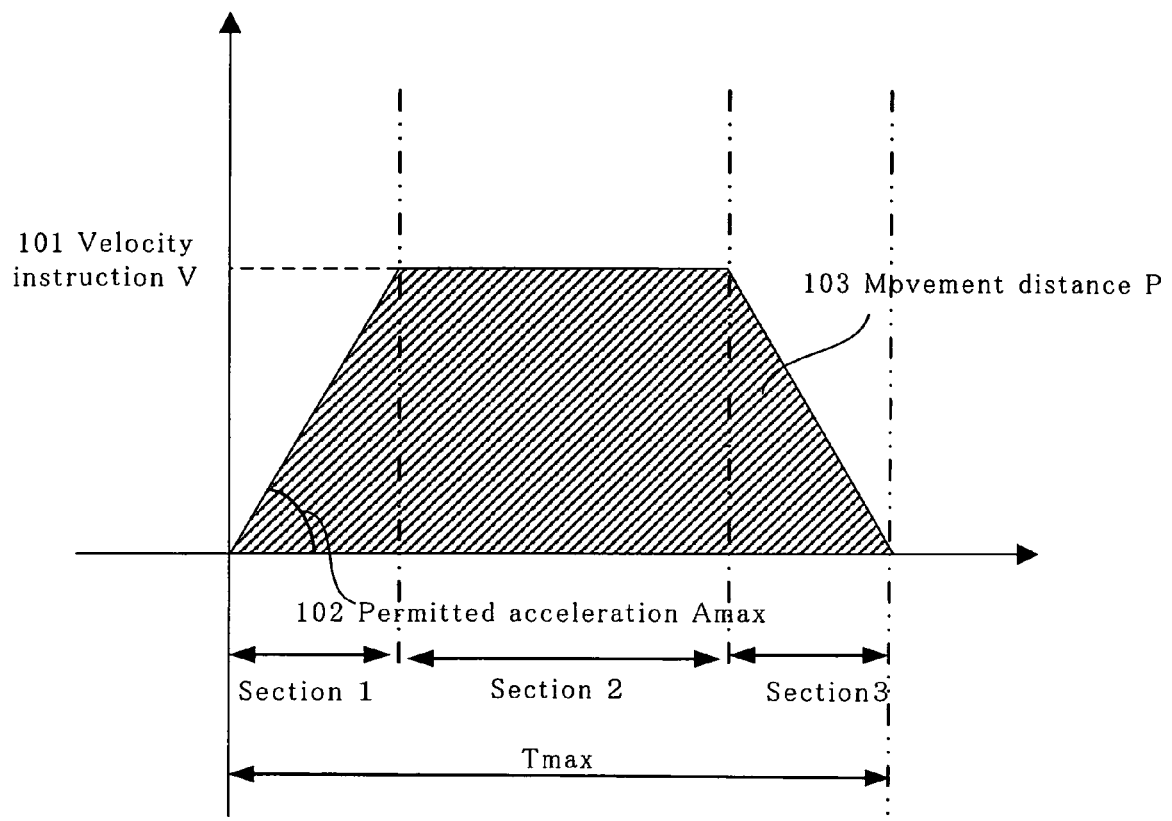
FIG. 6 is a graph showing a velocity instruction shape according to the present invention.

Initially, at Step 1, conditions of the maximum movable distance Pmax of the control object 30, the permitted velocity Vmax thereof and the permitted acceleration Amax thereof are set. The setting can be performed by selecting a smaller value between the limit of the object machine and the limit of the motor, or can be arbitrarily decided. Next, at Step 2, the velocity instruction V is calculated from the maximum acceleration Amax set at Step 2 and the maximum operation time Tmax decided by restrictions of memories or the like. When the velocity shape is set as a trapezoidal shape as shown in FIG. 6 and the ratio of Section 1:Section 2: Section 3 is set to 1:2:1, the velocity V can be uniquely obtained by the following equation.

$$V = A\max \times T\max / 4 \tag{1}$$

At Step 3, the calculated velocity V and the maximum velocity Vmax are compared, and the smaller value thereof is defined as the velocity instruction V. At Step 4, based on V and Amax, the movement distance P is calculated by the following equation.

$$P = 3V^2 / A\max \tag{2}$$

The calculated P is compared with Pmax at Step 5. The smaller value thereof is defined as a movement distance P. Lastly, depending on the movement distance, the velocity instruction V is recalculated by the following equation.

$$V = (A\max \cdot P / 3)^{1/2} \tag{3}$$

As explained above, the velocity instructions of the velocity V and the movement distance P calculated within the limitations can be generated while keeping the instruction acceleration to the permitted acceleration Amax. This velocity instruction is integrated to obtain a position instruction, and this position instruction is inputted into the motor control device shown in FIG. 1. This enables high accuracy inertia identification within the limitation range.

FIG. 6 shows an instruction velocity shape of the invention, and the horizontal axis shows the time and the vertical axis shows the instruction velocity. The reference numeral 101 denotes a velocity instruction V, 102 denotes a permitted acceleration Amax, 103 denotes a movement distance P (shaded portion in the figure), Section 1 is an acceleration section, Section 2 is a constant velocity section, and Section 3 is a deceleration section.

Steps 1 to 5 of the flowchart showing the processing steps for generating the optimal instruction shown in FIG. 5 can be stored in a program storage medium, or can be downloaded as software (engineering tool) via the Internet. This software can be installed on a motor control device in advance. In accordance with the version upgrade of this software, the up-to-date software can be downloaded via a program storage medium or the Internet. The instruction generation unit 50 can be installed not only in a motor control device but also in a general-purpose personal computer or an upper control device.

EXAMPLE 2

Figure 2:
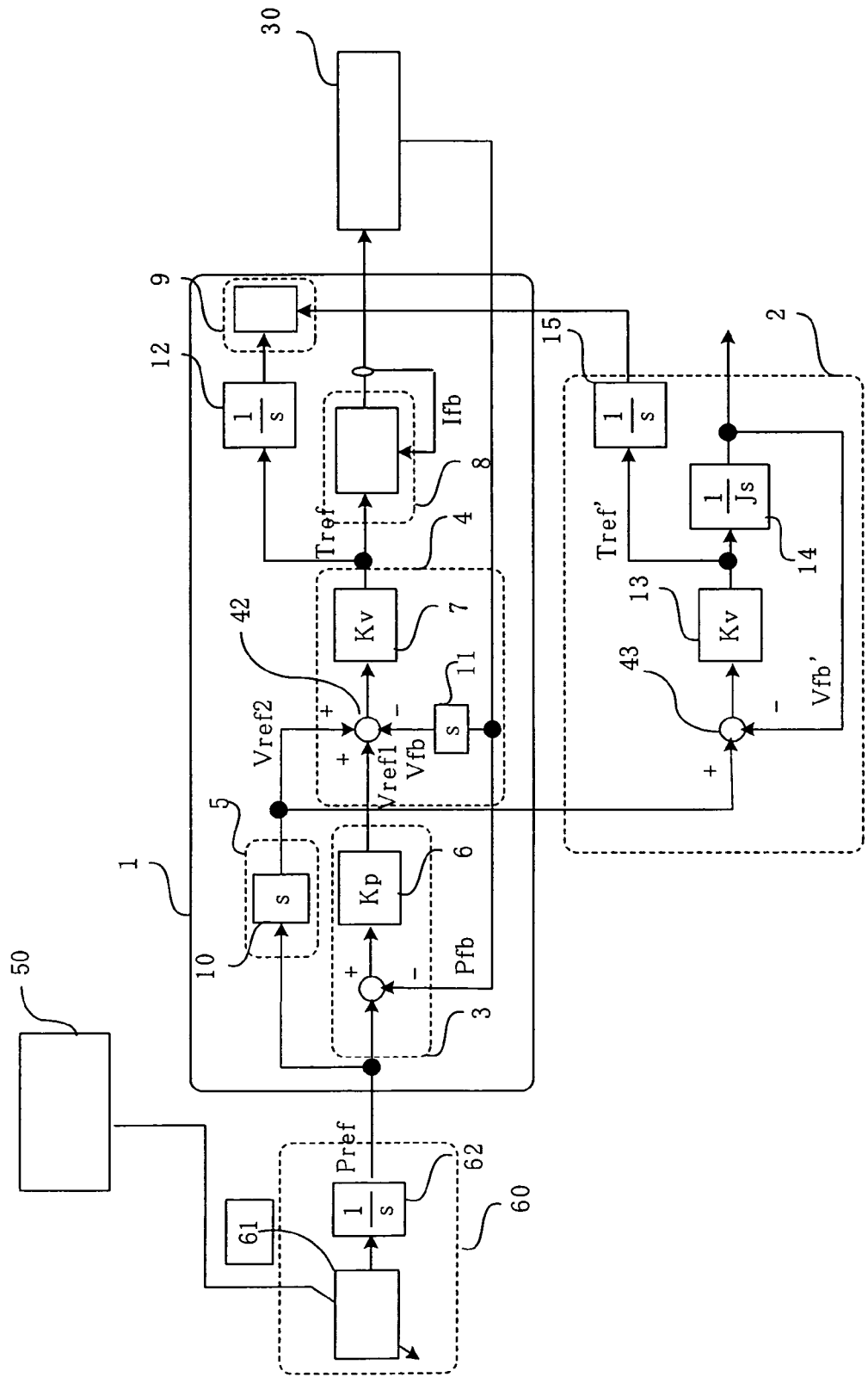
FIG. 2 is a block diagram showing a second structure of a motor control device for executing the method of the present invention.
Figure 3:
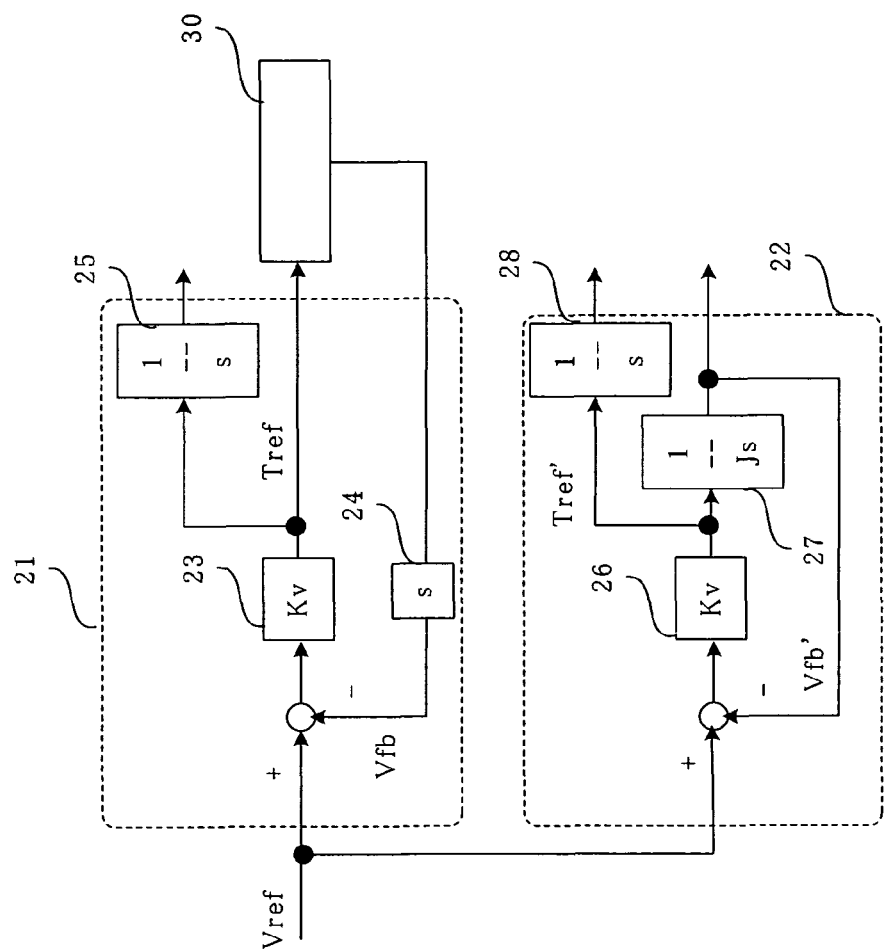
FIG. 3 is a block diagram showing a control structure of a conventional motor control device.
Figure 4:
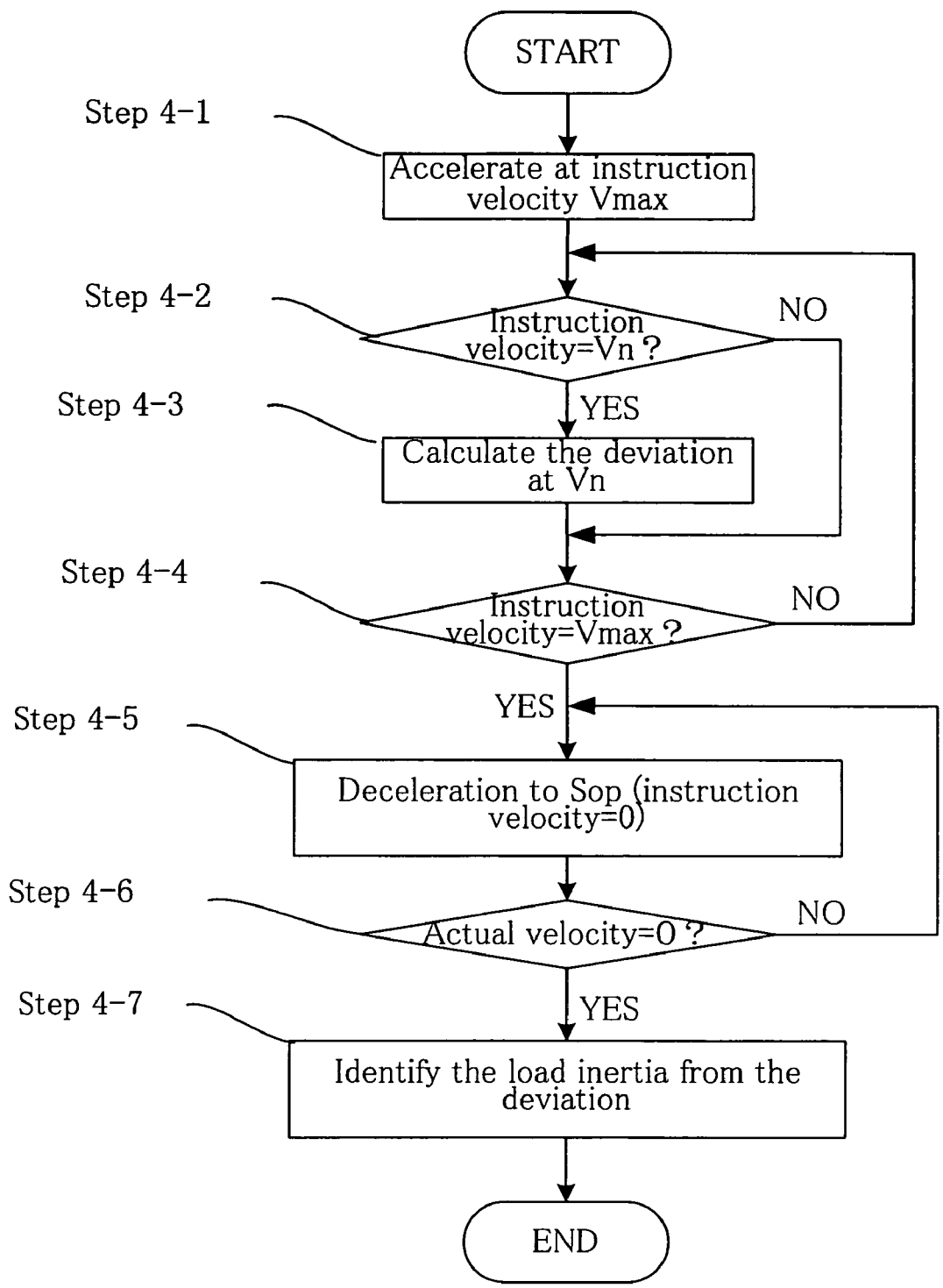
FIG. 4 is a flowchart showing processing steps of a conventional method.

FIG. 2 is a block diagram showing a second structure of a motor control device for executing a method of the invention. This is a motor control device enhanced in response by adding a velocity feedforward portion 5 and a differentiator 10 to the structure shown in FIG. 1. Other structures are the same as those shown in FIG. 1.

Also in the structure shown in FIG. 2, through the processing similar to that of Example 1, high accuracy inertia identification can be performed. The motor control device according to this invention can automatically generate the most appropriate velocity instruction shape pattern for inertia identification by simply inputting the maximum movable distance, the permitted velocity, the permitted acceleration, and the permitted operation time of the machine without requiring any skill to identify the inertia (inertia moment) of a servo motor for use in, e.g., a robot and a numerical control device.

The motor control device according to this invention can automatically generate the most appropriate velocity instruction shape pattern for inertia identification by simply inputting the maximum movable distance, the permitted velocity, the permitted acceleration, and the permitted operation time of the machine without requiring any skill to identify the inertia (inertia moment) of a servo motor for use in, e.g., a robot and a numerical control device.

What is claimed is:

1. A motor control device, comprising:
a position control unit for generating a velocity instruction based on a position instruction and a motor position;
a velocity control unit for generating a torque instruction based on the velocity instruction and a motor velocity; and
a motor drive unit for generating motor current based on the torque instruction,
wherein the motor control device further comprises a model control unit for generating a model torque instruction based on the velocity instruction and a model velocity, an inertia identification unit for identifying inertia from a predetermined position instruction according to a ratio of a motor torque instruction integrated value obtained by temporal integration of the torque instruction of the motor at a predetermined section and a model torque instruction integrated value obtained by temporal integration of the model torque instruction at a predetermined section, and an instruction shape generation unit for automatically generating an instruction shape upon identification according to conditions of a maximum movable distance, a permitted velocity, a permitted acceleration, and a maximum operation time of an object machine.

2. The motor control device as recited in claim 1, wherein the motor control device further comprises a velocity feedforward generation portion for generating a velocity feedforward instruction by differentiating the position instruction, and wherein the model control unit is configured to generate the model torque instruction based on the velocity feedforward instruction and the model velocity.

3. The motor control device as recited in claim 1, wherein the instruction shape generation unit generates the instruction shape by setting respective smaller values of the maximum movable distance, the permitted velocity and the permitted acceleration of the object machine and the maximum movable distance, the permitted velocity and the permitted acceleration of the motor as the conditions of the maximum movable distance, the permitted velocity, and the permitted acceleration.

4. The motor control device as recited in claim 3, wherein the instruction shape generation unit generates a trapezoidal velocity instruction and calculates uniquely the instruction shape by fixing the ratio of an acceleration section, a constant velocity section and a deceleration section.

5. The motor control device as recited in claim 4, wherein a ratio of the acceleration section, the constant velocity section and the deceleration section is set to 1:2:1,
wherein the maximum movable distance Pmax, the permitted velocity value Vmax, the permitted acceleration value Amax, the permitted operation time Tmax are set, and the velocity instruction V is calculated by the following equation (1):

$$V = 4A\text{max}/T\text{max} \qquad (1)$$

wherein the calculated velocity instruction V and the permitted velocity Vmax are compared, and the smaller value thereof is set as the velocity instruction V, and the movement distance P is calculated by the following question (2):

$$P = 3V^2/A\text{max} \qquad (2)$$

wherein the calculated movement distance P is compared with the maximum movable distance Pmax, and the smaller value thereof is set as a new movement distance P.

6. A motor control method of a motor control device comprising a position control unit for generating a velocity instruction based on a position instruction and a motor position, a velocity control unit for generating a torque instruction based on the velocity instruction and a motor velocity, a motor drive unit for generating motor current based on the torque instruction, a model control unit for generating a model torque instruction based on the velocity instruction and a model velocity, and an inertia identification unit for identifying inertia from a predetermined position instruction according to a ratio of the motor torque instruction integrated value obtained by temporal integration of the torque instruction of the motor at a predetermined section and a model torque instruction integrated value obtained by temporal integration of the model torque instruction at a predetermined section, the method comprising:
a step (step 1) of setting a maximum movable distance Pmax, a permitted velocity value Vmax, and a permitted acceleration value Amax;
a step (step 2) of calculating a velocity instruction V based on the set permitted acceleration and deceleration value Amax and a maximum operation time Tmax;
a step (step 3) of comparing the velocity instruction V and the permitted velocity value Vmax and setting the smaller value thereof as the velocity instruction V;
a step (step 4) of calculating the movement distance P based on the velocity instruction V and the permitted acceleration value Amax; and
a step (step 5) of comparing the calculated movement distance P and the maximum movable distance Pmax and setting the smaller value thereof as the movement distance P.

7. The motor control method as recited in claim 6,
wherein the velocity instruction is set as a trapezoidal shape in which a ratio of the acceleration section, the constant velocity section and the deceleration section is set as 1:2:1,
wherein the velocity instruction V is calculated by the following equation (1):

$$V = 4A\text{max}/T\text{max} \qquad (1)$$

wherein the calculated velocity instruction V and the permitted velocity Vmax are compared, and the smaller value thereof is set as the velocity instruction V, and the movement distance P is calculated by the following question (2):

$$P = 3V^2/A\text{max} \qquad (2)$$

wherein the calculated movement distance P is compared with the maximum movable distance Pmax, and the smaller value thereof is set as the movement distance P.

8. A non-transitory program storage medium storing a program for automatically generating an inertia identifying velocity instruction shape in a motor control device, the program being configured to execute:
a step (step 1) of setting a maximum movable distance Pmax, a permitted velocity value Vmax, and a permitted acceleration value Amax;
a step (step 2) of calculating a velocity instruction V based on the set permitted acceleration and deceleration value Amax and a maximum operation time Tmax;

a step (step 3) of comparing the velocity instruction V and the permitted velocity value Vmax and setting the smaller value thereof as the velocity instruction V;

a step (step 4) of calculating a movement distance P based on the velocity instruction V and the permitted acceleration value Amax; and a step (step 5) of comparing the calculated movement distance P and the maximum movable distance Pmax and setting the smaller value thereof as the movement distance P.

* * * * *